United States Patent
Kim et al.

(10) Patent No.: US 9,543,789 B2
(45) Date of Patent: Jan. 10, 2017

(54) APPARATUS AND METHOD FOR TRANSMITTING/RECEIVING WIRELESS ENERGY IN ENERGY TRANSMISSION SYSTEM

(71) Applicant: ELECTRONICS AND TELECOMMUNICATIONS RESEARCH INSTITUTE, Daejon (KR)

(72) Inventors: Seong-Min Kim, Daejeon (KR); In-Kui Cho, Daejeon (KR); Jung-Ick Moon, Daejeon (KR); Je-Hoon Yun, Daejeon (KR); Sang-Hoon Cheon, Daejeon (KR); Yong-Hae Kim, Daejeon (KR); Myung-Lae Lee, Daejeon (KR); Seung-Youl Kang, Daejeon (KR); Woo-Jin Byun, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 758 days.

(21) Appl. No.: 13/681,636

(22) Filed: Nov. 20, 2012

(65) Prior Publication Data
US 2013/0320760 A1 Dec. 5, 2013

(30) Foreign Application Priority Data
Jun. 1, 2012 (KR) ........................ 10-2012-0059148

(51) Int. Cl.
*H02J 17/00* (2006.01)

(52) U.S. Cl.
CPC ............... *H02J 17/00* (2013.01); *H02J 50/00* (2016.02); *H02J 50/12* (2016.02); *H02J 50/80* (2016.02); *Y10T 307/25* (2015.04); *Y10T 307/297* (2015.04)

(58) Field of Classification Search
CPC ............ H02J 17/00; H02J 50/00; H02J 50/12; H02J 50/80; Y10T 307/297; Y10T 307/25
See application file for complete search history.

(56) References Cited

U.S. PATENT DOCUMENTS 7,765,300 B2 * 7/2010 Meehan et al. ............... 709/226
8,571,609 B2 * 10/2013 Hwang et al. ............... 455/573
(Continued)

FOREIGN PATENT DOCUMENTS

JP 2011-193619 A 9/2011
KR 1020110074020 A 6/2011
(Continued)

*Primary Examiner* — Zeev V Kitov
(74) *Attorney, Agent, or Firm* — Ladas & Parry LLP (57) ABSTRACT

Disclosed are an apparatus and a method for transmitting/receiving wireless energy in an energy transmission system. The apparatus includes: a transmitting controller configured to generate a wireless energy signal; a transmitting resonance body port configured to transmit the wireless energy signal; and a transmitting resonance body configured to transmit the wireless energy signal transmitted through the transmitting resonance body port to receiving apparatuses, wherein the transmitting controller transmits impedance control signals for controlling impedance of each of the receiving resonance body ports of the plurality of receiving apparatuses.

20 Claims, 8 Drawing Sheets

(56) References Cited

U.S. PATENT DOCUMENTS

| | | | |
|---|---|---|---|
| 8,760,007 B2* | 6/2014 | Joannopoulos | B60L 11/182 307/104 |
| 2009/0284369 A1* | 11/2009 | Toncich et al. | 340/539.3 |
| 2011/0156490 A1 | 6/2011 | Hwang et al. | |
| 2011/0244913 A1 | 10/2011 | Kim et al. | |
| 2012/0038220 A1* | 2/2012 | Kim et al. | 307/104 |
| 2014/0153491 A1* | 6/2014 | Lee et al. | 370/328 |

FOREIGN PATENT DOCUMENTS

| | | |
|---|---|---|
| KR | 1020110110987 A | 10/2011 |
| WO | 2011/062827 A2 | 5/2011 |

\* cited by examiner

APPARATUS AND METHOD FOR TRANSMITTING/RECEIVING WIRELESS ENERGY IN ENERGY TRANSMISSION SYSTEM

CROSS-REFERENCE TO RELATED APPLICATIONS

The present application claims priority of Korean Patent Application No. 10-2012-0059148, filed on Jun. 1, 2012, which is incorporated herein by reference in its entirety.

BACKGROUND OF THE INVENTION

Field of the Invention

Exemplary embodiments of the present invention relates to an energy transmission system, and more particularly, to an apparatus and a method for transmitting/receiving wireless energy using a magnetic resonance method.

Description of Related Art

An example of the multiple wireless energy transmission method in accordance with the related art may include a time division method and a frequency division method. The time division method sequentially transmits energy to a plurality of receivers by dividing time. When using the time division method, it may take long time to transmit energy to a plurality of receivers. The frequency division method for overcoming the disadvantages transmits energy to a plurality of receivers, respectively, through signals having different frequencies. The frequency division method requires signals having frequency components corresponding to the number of receivers and needs to have a wide bandwidth for transmission characteristic between magnetic resonance coils for transmitting the signals. However, the frequency division method requires a complex transmitter structure for generating a plurality of frequency components and is hardly configured to have a wide bandwidth for transmission using magnetic resonance.

SUMMARY OF THE INVENTION

An embodiment of the present invention is directed to an apparatus and a method for transmitting/receiving wireless energy capable of simultaneously transmitting energy to plurality of receivers in an energy transmission system.

Another embodiment of the present invention is directed to an apparatus and a method for transmitting/receiving wireless energy capable of simultaneously transmitting energy to plurality of receivers in an energy transmission system without time delay.

Still another embodiment of the present invention is directed to an apparatus and a method for transmitting/receiving wireless energy capable of simultaneously transmitting energy to plurality of receivers in an energy transmission system without a complex structure and a wide bandwidth.

The foregoing and other objects, features, aspects and advantages of the present invention will be understood and become more apparent from the following detailed description of the present invention. Also, it can be easily understood that the objects and advantages of the present invention can be realized by the units and combinations thereof recited in the claims.

An apparatus for transmitting wireless energy in an energy transmission system includes: a transmitting controller configured to generate a wireless energy signal; a transmitting resonance body port configured to transmit the wireless energy signal; and a transmitting resonance body configured to transmit the wireless energy signal transmitted through the transmitting resonance body port to receiving apparatuses, wherein the transmitting controller transmits impedance control signals for controlling impedance of each of the receiving resonance body ports of the plurality of receiving apparatuses.

An apparatus for receiving wireless energy in an energy transmission system includes: a receiving resonance body configured to receive a wireless energy signal; a receiving resonance body port configured to receive the wireless energy signal from the receiving resonance body; and a receiving controller configured to transmit the wireless energy signal to a load and control impedance of the receiving resonance body port according to impedance control signals generated in consideration of transmission characteristic.

A method for transmitting/receiving wireless energy in an energy transmission system includes: transmitting, by each of the plurality of receivers, transmission state information for receiving wireless energy to a transmitter; controlling, by the transmitter, impedance of each of the plurality of receivers based on the transmission state information until the energy amount required in the plurality of receivers is transmitted; and setting impedance of the receiving resonance body port according to the impedance control and receiving a wireless energy signal according to the set impedance, by each of the plurality of receivers, wherein the transmission state information includes a received energy amount and a required energy amount of each of the plurality of receivers.

DESCRIPTION OF SPECIFIC EMBODIMENTS

Hereinafter, exemplary embodiments of the present invention will be described in detail with reference to the accompanying drawings. It is to be noted that only components required to understand an operation in accordance with the present invention is described below and the description of other components will be omitted not to unnecessarily obscure the subject matters of the present invention.

Embodiments of the present invention relate to an apparatus and a method for transmitting wireless energy to multiple devices, for example, a plurality of receivers in an energy transmission system. That is, the embodiments of the present invention relate to an apparatus and a method for transmitting wireless energy for simultaneously transmitting energy to a plurality of receivers through a transmitter having a single frequency component in an energy transmission system. Here, transmitted energy may be, for example, power, voltage, and the like, and the embodiment of the present invention may also be applied to transmission of other type of energies in addition to power.

In addition, for convenience of explanation, an apparatus for transmitting wireless energy is referred to as a transmitter and an apparatus for receiving wireless energy is referred to as a receiver.

Figure 1:
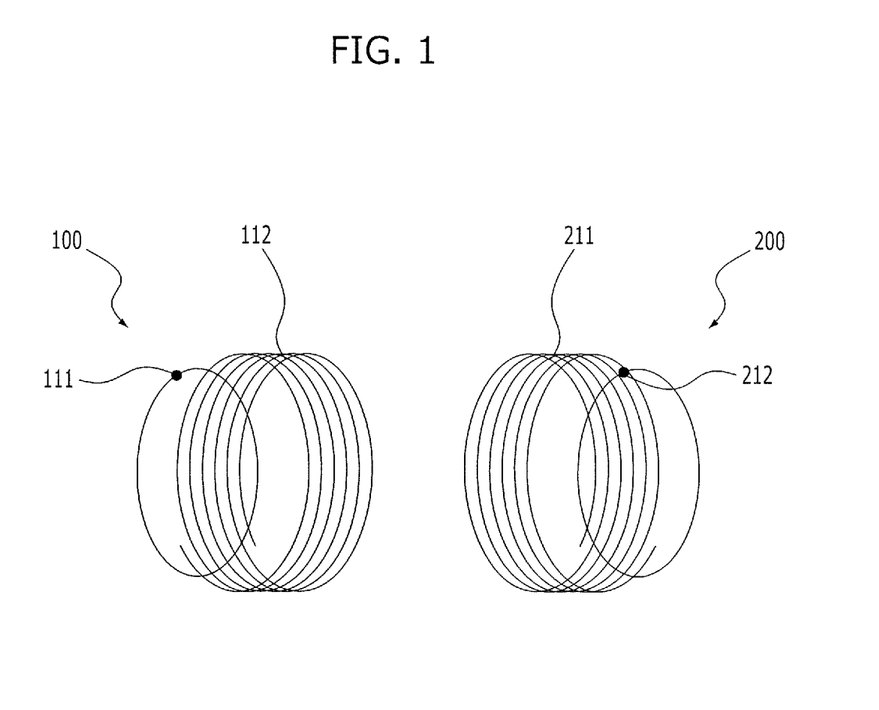
FIG. 1 is a diagram schematically illustrating resonance bodies of a transmitter and a receiver transmitting wireless energy in accordance with an embodiment of the present invention.

FIG. 1 is a diagram schematically illustrating resonant bodies of a transmitter and a receiver transmitting wireless energy in accordance with an embodiment of the present invention.

Referring to FIG. 1, a transmitter 100 generates a wireless energy signal and transmits the generated wireless energy signal. The transmitter 100 includes a transmitting resonance body port 111 and a transmitting resonance body 112.

The transmitting resonance body port 111 receives the wireless energy signal for transmitting energy. The transmitting resonance body port 111 transmits the input wireless energy signal to the transmitting resonance body 112.

The transmitting resonance body 112 transmits the wireless energy signal input through the transmitting resonance body port 111. For example, the transmitting resonance body 1112 may be configured of a resonance coil, and the like.

A receiver 200 receives the wireless energy signal and transmits the received wireless energy signal to devices (or loads) that are connected or coupled to the receiver 200 The receiver 200 includes a receiving resonance body 211 and a receiving resonance body port 212.

The receiving resonance body 211 receives the wireless energy signal. The receiving resonance body 211 outputs the received wireless energy signal to the receiving resonance body port 212.

The receiving resonance body port 212 outputs the wireless energy signal so as to be transmitted to the connected loads The transmitter 100 and the receiver 200 may use a magnetic resonance method so as to transmit the wireless energy signal. Here, the resonance coils of the transmitting resonance body 112 and the receiving resonance body 211 may have a helical structure. For example, the impedance of the transmitting resonance body port 111 and the receiving resonance body port 212 is set to be, for example, 50 ohm.

Figure 2:
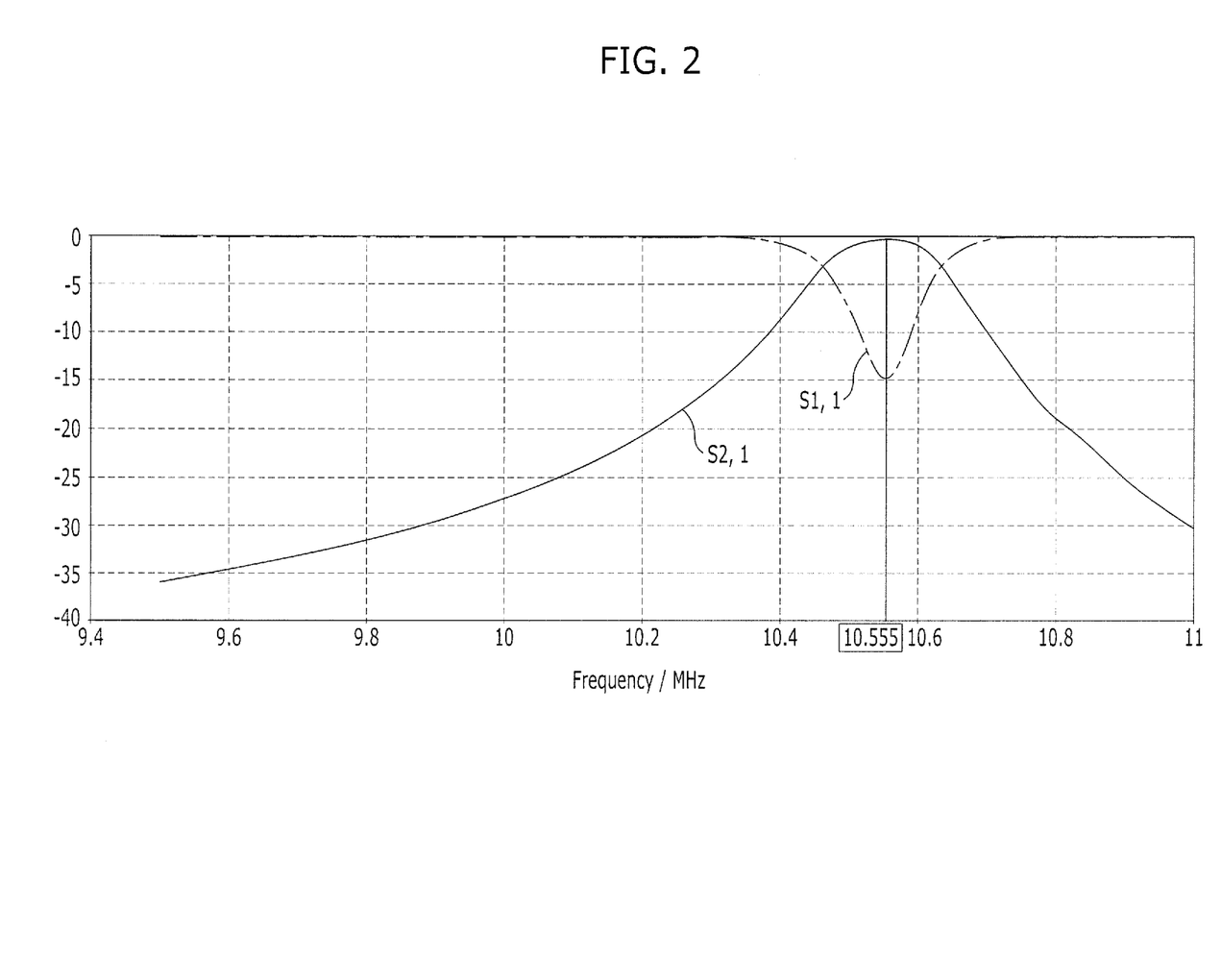
FIG. 2 is a graph schematically illustrating a transmission characteristic and a reflection characteristic between the transmitter and the receiver illustrated in FIG. 1.

FIG. 2 is a graph schematically illustrating a transmission characteristic and a reflection characteristic between the transmitter and the receiver illustrated in FIG. 1.

Referring to FIG. 2, when transmitting wireless energy between respective devices, that is, a single transmitter 100 and a single receiver 200, the transmission characteristic and the reflection characteristic of the transmitting resonance body 112 and the receiving resonance body 211 are shown on a graph.

A horizontal axis of the graph represents a frequency (having a MHz unit) and a vertical axis represents an S-parameter size (having dB unit).

The reflection characteristic S1, 1 and the transmission characteristic S2, 1 are shown. The transmission characteristic S2, 1 is a transmission characteristic of the wireless energy signal that is transmitted from the transmitting resonance body 112 to the receiving resonance body 211. For example, the transmission characteristic S2, 1 has high transmission efficiency as about −0.28 dB in a band of 10.555 MHz. As the transmission characteristic S2, 1 approaches 0 dB, the energy transmission efficiency is better. In addition, the reflection characteristic S1, 1 has a value of about −14.68 dB in a band of 10.555 MHz.

Figure 3:
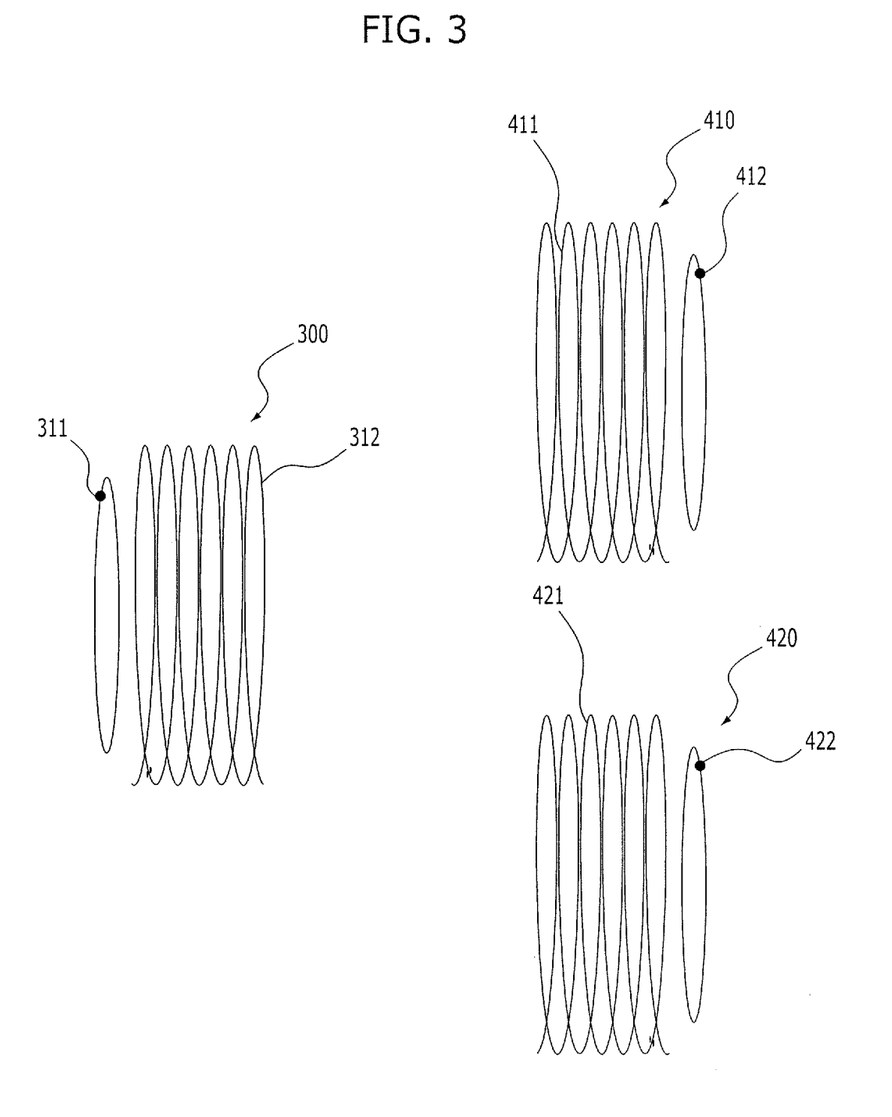
FIG. 3 is a diagram schematically illustrating resonance bodies of the transmitter and the receivers transmitting wireless energy between multiple devices in accordance with an embodiment of the present invention.

FIG. 3 is a diagram schematically illustrating resonant bodies of a transmitter and a receiver transmitting wireless energy between multiple devices in accordance with an embodiment of the present invention.

Referring to FIG. 3, a transmitter 300 generates a wireless energy signal and transmits the generated wireless energy signal. Here, the transmitter 300 transmits the wireless energy signal to multiple devices, that is, a plurality of receivers 410 and 420.

The transmitter 300 includes a transmitting resonance body port 311 and a transmitting resonance body 312.

The transmitting resonance body port 311 receives the wireless energy signal for transmitting energy. The transmitting resonance body port 311 transmits the input wireless energy signal to the transmitting resonance body 312.

The transmitting resonance body 312 transmits the wireless energy signal input through the transmitting resonance body port 311. For example, the transmitting resonance body 312 may be configured of a resonance coil, and the like.

The receivers 410 and 420 receive the wireless energy signal and transmit the received wireless energy signal to devices (or loads) that are connected or coupled to the receivers 410 and 420, respectively.

The first receiver 410 includes a first receiving resonance body 411 and a first receiving resonance body port 412.

The first receiving resonance body 411 receives the wireless energy signal. The first receiving resonance body 411 outputs the received wireless energy signal to the first receiving resonance body port 412.

The first receiving resonance body port 412 outputs the wireless energy signal so as to be transmitted to the connected loads.

In addition, the second receiver 420 includes a second receiving resonance body 421 and a second receiving resonance body port 422. The second receiver 420 has a structure similar to the first receiver 410. Therefore, the second receiving resonance body 421 and the second receiving resonance body port 422 will be described with reference to the operation description of the first receiving resonance body 411 and the first receiving resonance body port 412.

Even in this case, the transmitter 300 and the receivers 410 and 420 may use a magnetic resonance method so as to transmit the wireless energy signal. Here, the resonance coils of the transmitting resonance body 312 and the receiving resonance bodies 411 and 421 may have a helical structure.

The impedance of the transmitting resonance body port 311 may be set to be, for example, 50 ohm.

However, in the receivers 410 and 420 in accordance with the embodiment of the present invention, the impedance of the receiving resonance body ports 412 and 422 may be changed in consideration of required energy amount, received energy amount, and the like, of each receiver 410 and 420. The transmitter 300 may transmit the wireless energy to the plurality of receivers 410 and 420 based on the change in impedance.

Here, the structure of the transmitting resonance body 312 and the receiving resonance bodies 411 and 421 is described by way of example and the structure of another type of resonance body may also have the same characteristics.

Meanwhile, the two receivers 410 and 420 receiving wireless energy from the single transmitter 300 are described herein, by way of example, which is for convenience of explanation. Therefore, the embodiment of the present invention may also be applied to three or more receivers.

Figure 4:
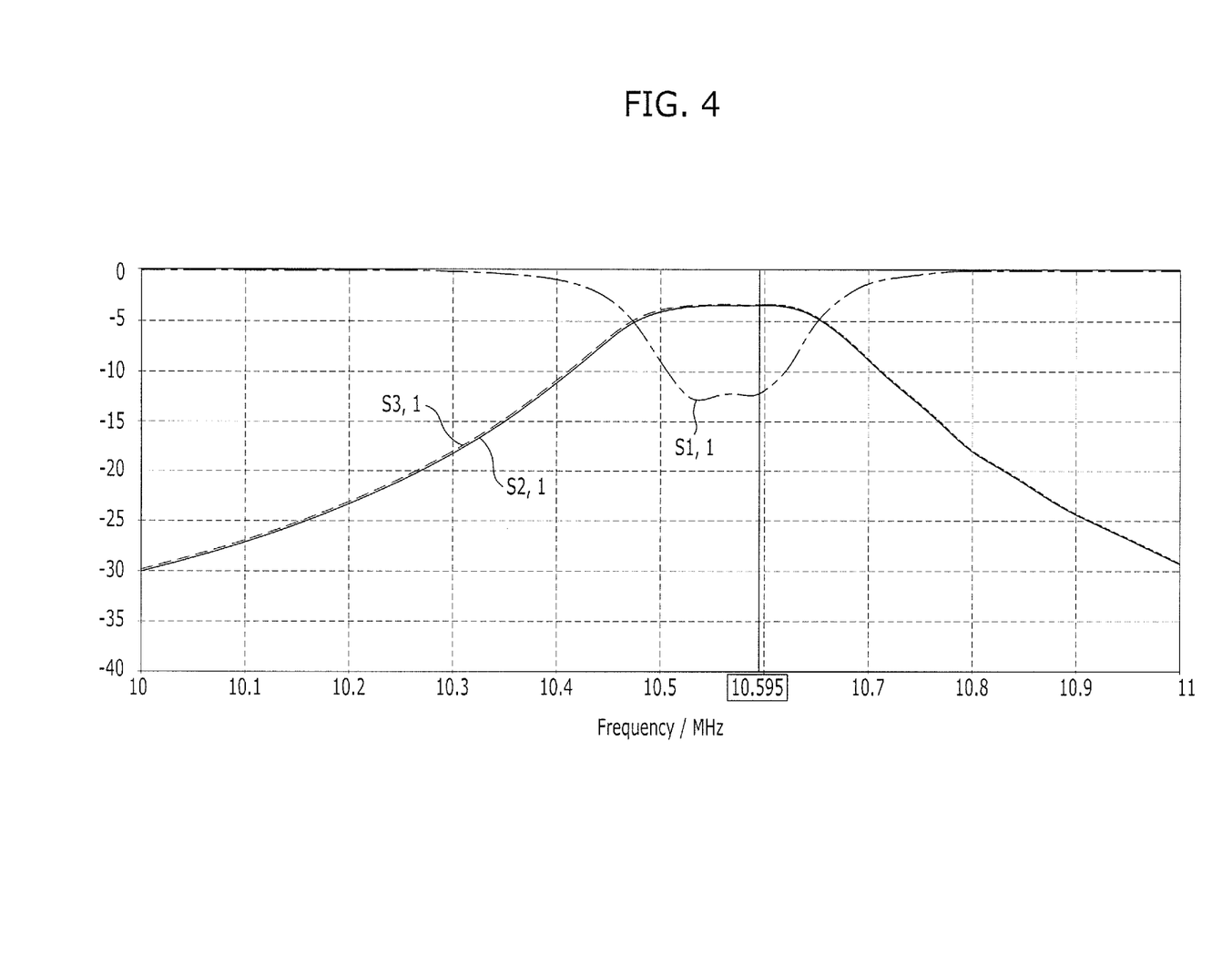
FIG. 4 is a graph schematically illustrating the transmission characteristic and the reflection characteristic between the transmitter and the receivers illustrated in FIG. 3.

FIG. 4 is a graph schematically illustrating the transmission characteristic and the reflection characteristic between the transmitter and the receivers illustrated in FIG. 3.

Referring to FIG. 4, when transmitting wireless energy between multiple devices, that is, the single transmitter 300 and the plurality of receivers 410 and 420, the transmission characteristics and the reflection characteristics of the transmitting resonance body 312 and the receiving resonance bodies 411 and 421 are shown on a graph. The transmitter 300 and the receivers 410 and 420 use the magnetic resonance method having a helical structure.

Here, the graph shows the transmission characteristic and the reflection characteristic when the impedance of the receiving resonance body ports 412 and 422 are set to be 50 ohm.

A horizontal axis of the graph represents a frequency (having a MHz unit) and a vertical axis represents an S-parameter size (having dB unit).

The reflection characteristic S1, 1 and the transmission characteristics S2, 1 and S3, 1 are shown. The transmission characteristic S2, 1 is the transmission characteristic of the wireless energy signal that is transmitted from the transmitting resonance body 312 to the receiving resonance body 411. For example, the transmission characteristic S2, 1 has high transmission efficiency as a value of about −3.40 dB in a band of 10.595 MHz. The second transmission characteristic S3, 1 is the transmission characteristic of the wireless energy signal that is transmitted from the transmitting resonance body 312 to the receiving resonance body 421. For example, the transmission characteristic S3, 1 has a value of about −3.44 dB in a band of 10.595 MHz.

In addition, the reflection characteristic S1, 1 has a value of about −12.12 dB in a band of 10.595 MHz.

Therefore, when each impedance of the receiving resonance body ports 412 and 422 is set to be 50 ohm, the ports 412 and 422 have the same transmission characteristic (about −3 dB). Therefore, it may be confirmed that the same energy amount is transmitted to the receivers 410 and 420.

Figure 5:
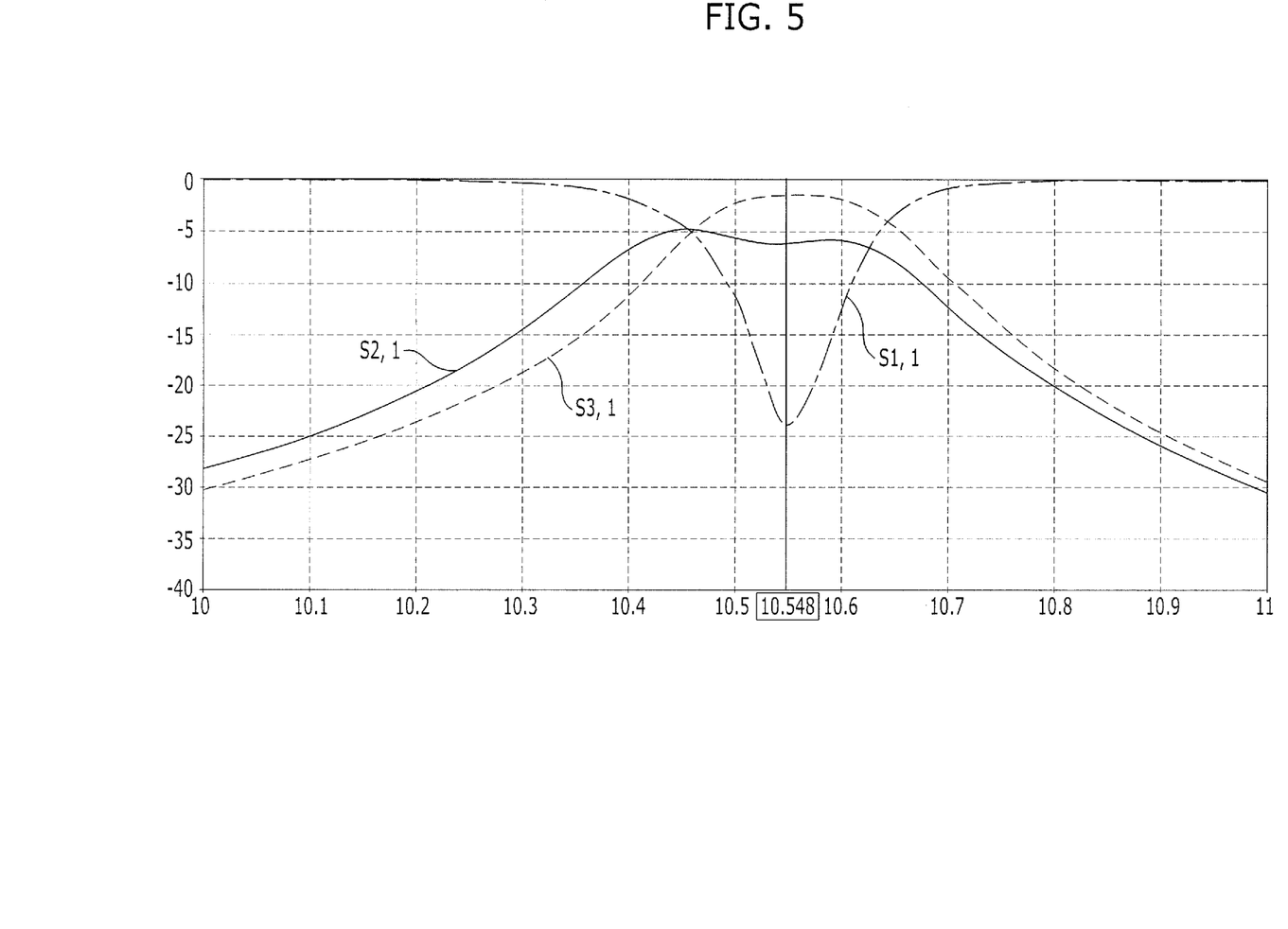
FIG. 5 is a graph schematically illustrating the transmission characteristic and the reflection characteristic according to a change in impedance of receiving resonance body ports between the transmitter and the receivers illustrated in FIG. 3.

FIG. 5 is a graph illustrating the transmission characteristic and the reflection characteristic according to a change in impedance of the receiving resonance body ports between the transmitter and the receivers illustrated in FIG. 3.

Referring to FIG. 5, when transmitting wireless energy between multiple devices, that is, the single transmitter 300 and the plurality of receivers 410 and 420, the transmission characteristic and the reflection characteristic of the transmitting resonance body 312 and the receiving resonance bodies 411 and 421 are shown on a graph. The transmitter 300 and the receivers 410 and 420 use the magnetic resonance method having a helical structure.

Here, the graph shows the transmission characteristic and the reflection characteristic when the impedance of the first receiving resonance body port 412 is set to be 150 ohm and the impedance of the second receiving resonance body port 422 is set to be 50 ohm.

A horizontal axis of the graph represents a frequency (having a MHz unit) and a vertical axis represents an S-parameter size (having dB unit).

The reflection characteristic S1, 1 and the transmission characteristics S2, 1 and S3, 1 are shown. The transmission characteristic S2, 1 is the transmission characteristic of the wireless energy signal that is transmitted from the transmitting resonance body 312 to the receiving resonance body 411. For example, the transmission characteristic S2, 1 has a value of about −6.15 dB in a band of 10.548 MHz. The second transmission characteristic S3, 1 is the transmission characteristic of the wireless energy signal that is transmitted from the transmitting resonance body 312 to the receiving resonance body 421. For example, the transmission characteristic S3, 1 has a value of about −1.44 dB in a band of 10.548 MHz.

In addition, the reflection characteristic S1, 1 has a value of about −23.74 dB in a band of 10.548 MHz.

Therefore, when the impedance of the first receiving resonance body port 412 is set to be 150 ohm and the impedance of the second receiving resonance body port 422 is set to be 50 ohm, the energy amount transmitted to the receivers 410 and 420 is changed. That is, it can be confirmed that a larger amount of energy is transmitted to the second receiving resonance body 421 than to the first receiving resonance body 411.

On the other hand, when the impedance of the second receiving resonance body port 422 is increased, the characteristic is opposite to the above characteristic. In this case, a larger amount of energy is transmitted to the first receiving resonance body 411 than to the second receiving resonance body 421.

The embodiment of the present invention may control the energy amount transmitted between the multiple devices based on the control of impedance of each of the receiving resonance body ports of the plurality of receivers.

Figure 6:
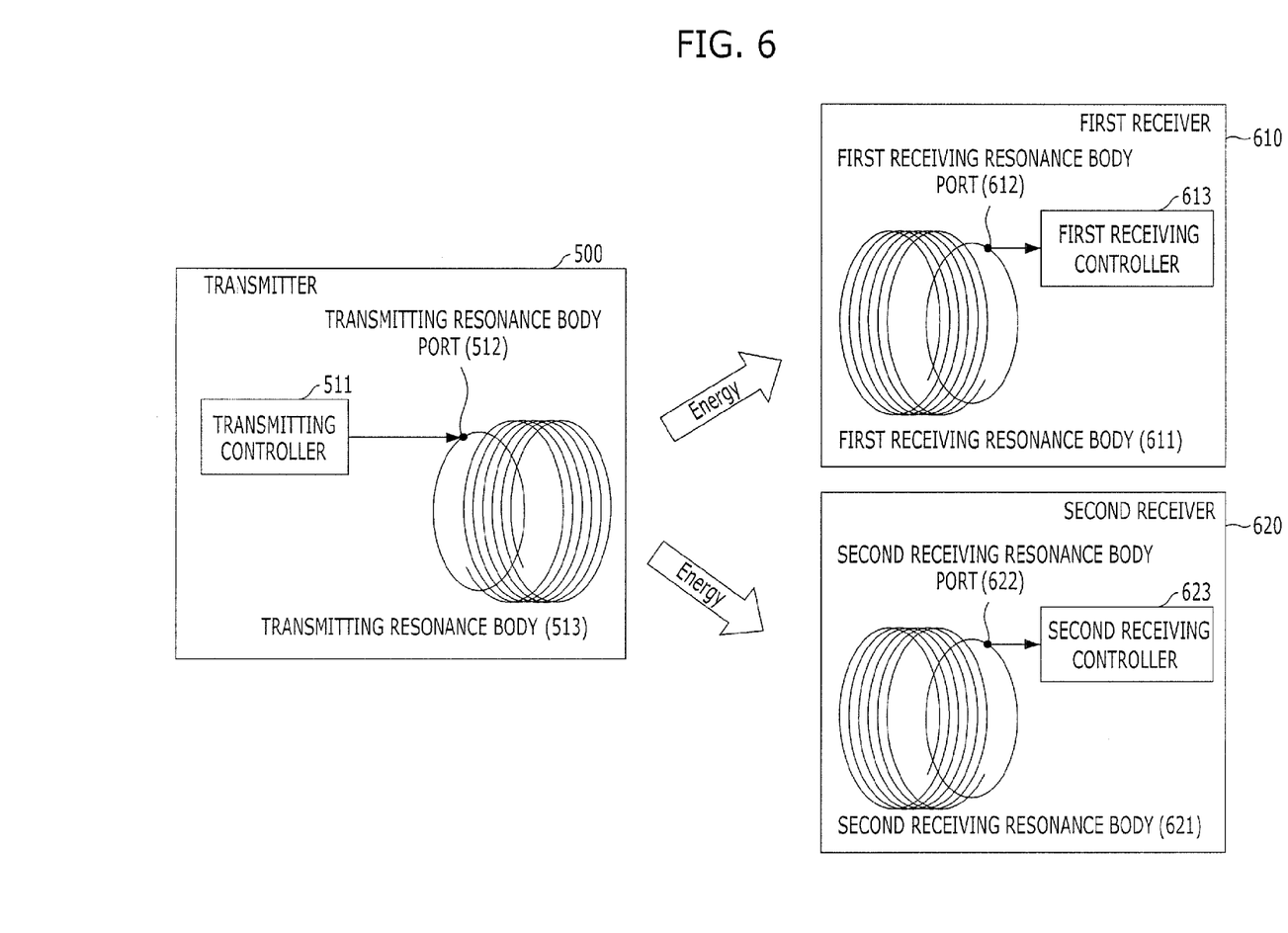
FIG. 6 is a diagram schematically illustrating the transmitter and the receiver transmitting wireless energy between multiple devices in accordance with an embodiment of the present invention.

FIG. 6 is a diagram schematically illustrating the transmitter and the receiver transmitting the wireless energy between the multiple devices in accordance with an embodiment of the present invention.

Referring to FIG. 6, a transmitter 500 generates a wireless energy signal and transmits the generated wireless energy signal. Here, the transmitter 500 transmits the wireless energy signal to multiple devices, that is, a plurality of receivers 610 and 620. The transmitter 500 includes a transmitting controller 511, a transmitting resonance body port 512, and a transmitting resonance body 513.

The receivers 610 and 620 receive the wireless energy signal and transmit the received wireless energy signal to devices (or loads) that are connected or coupled to the receivers 610 and 620, respectively. The first receiver 610 includes a first receiving resonance body 611, a first receiving resonance body port 612, and a first receiving controller 613. Further, the second receiver 620 includes a second receiving resonance body 621, a second receiving resonance body port 622, and a second receiving controller 623.

First, the transmitter 500 will be described. The transmitting controller 511 generates the wireless energy signal. The transmitting controller 511 is connected to the transmitting resonance body port 512 and outputs the wireless energy signal to the transmitting resonance body port 512. The transmitting controller 511 controls a general operation of the transmitter 500 and generates impedance control signals for controlling the impedance of the receiving resonance body ports 612 and 622 based on transmission characteristic information received from the receivers 610 and 620, for example, the required energy amount, the received energy amount, the impedance information of the receiving resonance body port, and the like.

The transmitting resonance body port 512 receives the wireless energy signal for transmitting energy from the transmitting controller 511. Here, the transmitting resonance body port 512 is connected to the transmitting resonance body 513. The transmitting resonance body port 512 transmits the input wireless energy signal to the transmitting resonance body 513.

The transmitting resonance body 513 transmits the wireless energy signal input through the transmitting resonance body port 512. For example, the transmitting resonance body 513 may be configured of a resonance coil, and the like.

Next, the receivers 610 and 620 will be described. In addition, the first receiving resonance body 611 receives the wireless energy signal. The first receiving resonance body 611 outputs the received wireless energy signal to the first receiving resonance body port 612.

The first receiving resonance body port 612 receives the wireless energy signal from the first receiving resonance body port 612. The first receiving resonance body port 612 outputs the wireless energy signal to the first receiving controller 613.

The first receiving controller 613 is connected to the first receiving resonance body port 612 and receives the wireless energy signal through the receiving resonance body port. The first receiving controller 613 transforms the received wireless energy signal and transmits the transformed energy signal to load, and the like, so as to be used as a power supply. To this end, the first receiving controller 613 may include the loads therein or may include the loads connected to the outside thereof. In addition, the first receiving controller 613 controls an operation of the first receiver 610.

Further, the second receiver 620 has a structure similar to the first receiver 610 and therefore, will be described with reference to the structure of the first receiver 610.

Even in this case, the transmitter 500 and the receivers 610 and 620 may use a magnetic resonance method so as to transmit the wireless energy signal. Here, the resonance coils of the transmitting resonance body 512 and the receiving resonance bodies 611 and 621 may have a helical structure.

Here, the structure of the transmitting resonance body 512 and the receiving resonance bodies 411 and 421 is described by way of example and the structure of another type of resonance body may also have the same characteristics.

The transmitting controller 511 and the receiving controllers 613 and 623 may include blocks performing a communication function for transmitting/receiving messages required to the transmission/reception of the wireless energy signal. Therefore, in order to transmit the wireless energy to the plurality of receivers 610 and 620, the transmitter 500 may transmit/receive messages from/to the plurality of receivers 610 and 620.

It is possible to effectively implement the multiple wireless energy transmission based on the message transmission between the transmitter 500 and the receivers 610 and 620.

Meanwhile, the two receivers 610 and 620 receiving the wireless energy from the single transmitter 500 are described herein, by way of example, which is for convenience of explanation. Therefore, the embodiment of the present invention may also be applied to three or more receivers.

Figure 7:
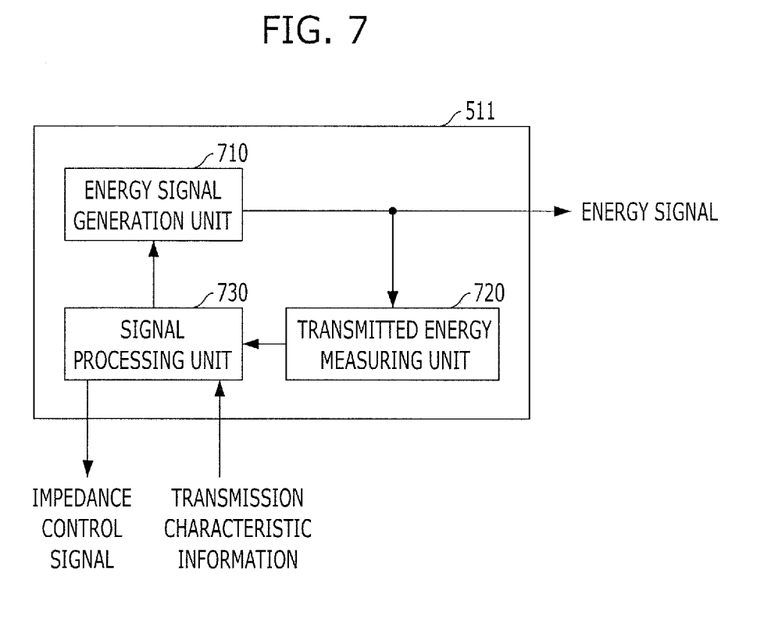
FIG. 7 is a diagram schematically illustrating a transmitting controller illustrated in FIG. 6.

FIG. 7 is a diagram schematically illustrating a transmitting controller illustrated in FIG. 6.

Referring to FIG. 7, the transmitting controller 511 includes an energy signal generation unit 710, a transmitted energy measuring unit 720, and a signal processing unit 730.

The energy signal generation unit 710 generates the wireless energy signal. The energy signal generation unit 710 outputs the wireless energy signal to the transmitting resonance body port 512. In this case, the energy signal generation unit 710 may control the transmitted energy amount of the wireless energy signal according to the control of the signal processing unit 730.

The transmitted energy measuring unit 720 measures the transmitted energy amount of the wireless energy signal output from the energy signal generation unit. The transmitted energy measuring unit 720 outputs the transmitted energy amount measured to control the energy amount of the transmitted wireless energy signal to the signal processing unit 730.

The signal processing unit 730 receives the transmitted energy amount and controls the transmitted energy amount of the wireless energy signal generated from the energy signal generation unit 710 based on the transmitted energy amount.

The signal processing unit 730 serves to communicate with the plurality of receivers 610 and 620. The signal processing unit 730 may receive the transmission characteristic information. Here, the transmission characteristic information includes information regarding the received energy amount and the required energy amount of the plurality of receivers and the impedance of the receiving resonance body port. The received energy amount is an energy amount of the wireless energy signal that is currently transmitted to the load of the receiver and the required energy amount is an energy amount that is required in the load of the receiver. The signal processing unit 730 can confirm the transmission characteristics of the plurality of receivers 610 and 620 through the reception of the transmission characteristic information.

The signal processing unit 730 generates the impedance control signals for controlling the energy amount received to the plurality of receivers 610 and 620, respectively, based on the confirmation of the transmission characteristic information. For example, the signal processing unit 730 generates the impedance control signals performing a control to reduce the impedance of the receiver that is required to increase the received energy amount, among the first receiver 610 and the second receiver 620. Alternatively, the signal processing unit 730 generates the impedance control signals performing a control to increase the impedance of the receiver that is required to reduce the received energy amount, among the first receiver 610 and the second receiver 620.

The signal processing unit 730 may receive the transmission characteristic information from the receivers at a predetermined interval to generate the impedance control signals until the required energy amount of each of the receivers 610 and 620 is satisfied. In addition, the signal processing unit 730 may use the transmission characteristic information for controlling the transmitted energy amount of the wireless energy signal generated from the energy signal generation unit 710.

The signal processing unit 730 transmits the impedance control signals generated for each of the receivers 610 and 620 to the receivers 610 and 620, respectively.

Figure 8:
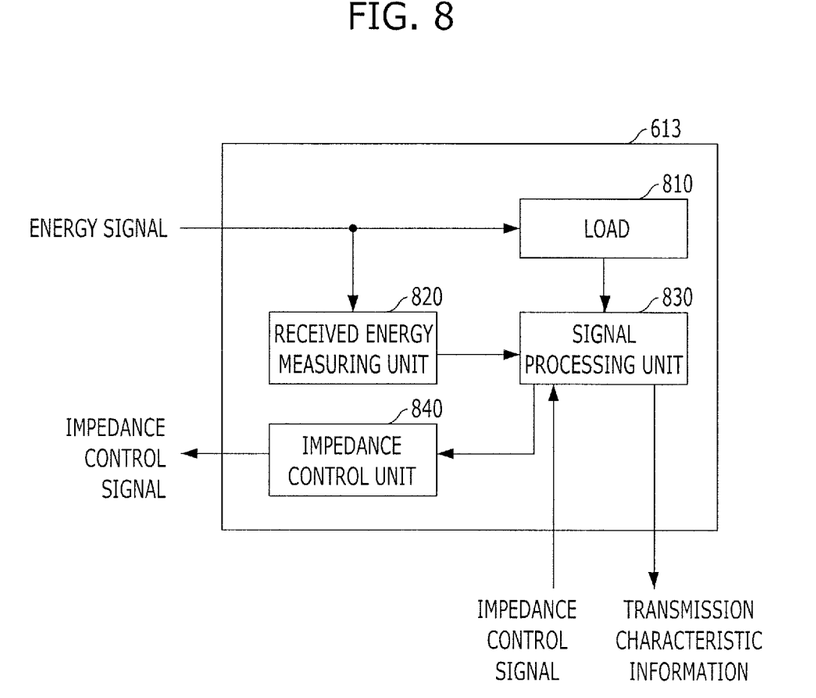
FIG. 8 is a diagram schematically illustrating a receiving controller illustrated in FIG. 6.

FIG. 8 is a diagram schematically illustrating a receiving controller illustrated in FIG. 6.

Referring to FIG. 8, the first receiving controller 613 includes a load 810, a received energy measuring unit 820, a signal processing unit 830, and an impedance control unit 840. However, the second receiving controller 623 included in the second receiver 620 of FIG. 6 may have a structure similar to the first receiving controller 613.

The load 810 receives the wireless energy signal through the first receiving resonance body port 612. The load 810 may be a device consuming the wireless energy and may be an operation power supply for an operation of the first receiver 610. Meanwhile, the load 810 may be included in the first receiving controller 613 or may be located at the outside of the first receiving controller 613.

The received energy measuring unit 820 measures the received energy amount of the wireless energy received through the first receiving resonance body port 612. The received energy measuring unit 820 outputs the received energy amount measured to the signal processing unit 830.

The signal processing unit 830 receives the received energy amount. The signal processing unit 830 may measure or receive the energy amount required from the load 810.

The signal processing unit 830 serves to communicate with the transmitter 500. The signal processing unit 830 may transmit the transmission characteristic information to the transmitter. Here, the transmission characteristic information includes the received energy amount, the required energy amount, and the impedance of the receiving resonance body port 612. The received energy amount is an energy amount of the wireless energy signal that is currently transmitted to the load 810 and the required energy amount is an energy amount that is required in the load. In addition, the impedance of the first receiving resonance body port 612 is an impedance value set in the first receiving resonance body port 612. The signal processing unit 830 can allow the transmitter 500 to confirm the transmission characteristics through the transmission of the transmission characteristic information. The signal processing unit 830 transmits the transmission characteristic information to the transmitter 500 until the received energy amount of the wireless energy signal satisfies the required energy amount. In this case, the signal processing unit 830 may transmit an identifier (ID) of the receiver for the division of the first receiver 610, together with the transmission characteristic information.

The signal processing unit 830 can receive the impedance control signals from the transmitter 500 according to the transmission of the transmission characteristic information. Here, the impedance control signal is a signal for controlling the impedance of the first receiving resonance body port 612. For example, the signal processing unit 830 may receive from the transmitter 500 the impedance signals performing a control to increase the impedance of the receiving resonance body port so as to reduce the received energy amount of the wireless energy signal. Further, the signal processing unit 830 may receive from the transmitter 500 the impedance signals performing a control to increase the impedance of the receiving resonance body port so as to increase the received energy amount of the wireless energy signal.

The signal processing unit 830 controls the impedance control unit 840 based on the received impedance control signals.

The impedance control unit 840 is connected to the first receiving resonance body port 612. The impedance control unit 840 controls the impedance of the first receiving resonance body port 612 according to the control of the signal processing unit 840. The impedance control unit 840 performs a control to increase or decrease the impedance of the first receiving resonance body port 612 according to the control of the signal processing unit 840.

In FIGS. 7 and 8, the signal processing units 730 and 830 may also transmit and receive messages through a separate antenna, and the like, and may also transmit and receive the messages using the transmitting resonance body 512 and the receiving resonance body 611.

Figure 9:
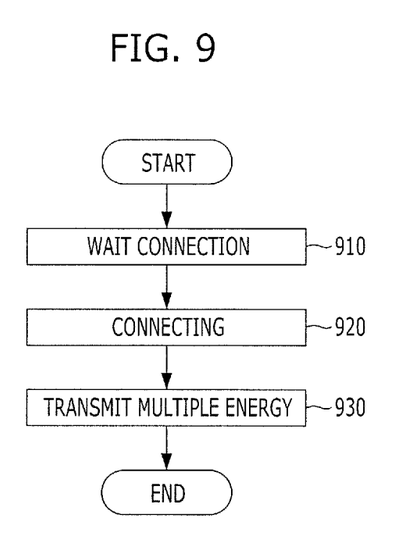
FIG. 9 is a flow chart schematically illustrating a multiple energy transmission operation between the transmitter and the receivers in accordance with the embodiment of the present invention.

FIG. 9 is a flow chart schematically illustrating a multiple energy transmission operation between the transmitter and the receivers in accordance with the embodiment of the present invention.

Referring to FIG. 9, the transmitter 500 and the plurality of receivers 610 and 620 perform waiting connection prepared for multiple energy transmission (S910).

The transmitter 500 performs a search for transmission environment for transmitting wireless energy to the receivers 610 and 620. In this case, each of the receivers 610 and 620 sets the impedance of the receiving resonance body ports 612 and 622 so as to be the predetermined impedance or more. For example, each of the receivers 610 and 620 sets the impedance of the receiving resonance body ports 612 and 622 so as to be about 500 ohm. As such, setting the impedance so as to be a value of 500 ohm or more by the receivers 610 and 620 is not to greatly change the energy transmission characteristics of the transmitter 500 and other receivers transmitting power.

Therefore, the transmitter 500 may recognize that the receivers 610 and 620 accesses the transmission area based on the change in the transmission characteristic of the transmitted wireless energy. For example, the transmitter 500 recognizes the access of the receivers 610 and 620 based on the change in the wireless energy amount transmitted from the transmitter or the change in the energy amount received from the receivers receiving the wireless energy, and the like. However, the transmitter 500 may recognize the access of the receivers 610 and 620 based on other various methods.

When the access of the receivers 610 and 620 is recognized (that is, recognizing that the receivers 610 and 620 are located within the wireless energy transmission area of the transmitter 500), the transmitter 500 shifts an operation to the accessing.

The transmitter 500 and the plurality of receivers 610 and 620 perform connecting therebetween for multiple energy transmission (S920).

The connecting performs connecting between the transmitter 500 and the receivers 610 and 620 and in the connecting, the information regarding the transmitted energy amount, the required energy amount, the received energy amount, and the impedance of the receiving resonance body port, and the like, is transmitted and received by transmitting the messages between the transmitter 500 and the receivers 610 and 620.

Each of the receivers 610 and 620 transmits their own identifiers (IDs), the required energy amount, the received energy amount, and the impedance of the receiving resonance body port to the transmitter.

The transmitter 500 receives the information regarding the identifier, the required energy amount, and the received energy amount of the receiver and the impedance of the received resonance body port from each of the receivers 610 and 620 that are newly connected. The transmitter 500 transmits the received information to all the receivers connected to the transmitter 500 in a type of broadcasting message. The transmitter recognizes the receivers through the reception of the message including the information.

The transmitter 500 can confirm the transmission characteristic based on the currently transmitted energy amount and the received information. The transmitter 500 calculates the transmitted energy amount of the wireless energy signal transmitted by summing the losses due to the transmission characteristic. The transmitter 500 controls the transmitted energy amount of the wireless energy signal based on the transmitted energy amount transmitted. The transmitter 500 transmits the wireless energy signal of which the transmitted energy amount is controlled to the transmitters.

Each of the receivers 610 and 620 transmits the message including the received energy amount and the required energy amount according to the wireless energy signal of which the transmitted energy amount is controlled to the transmitter 500.

When the transmitter 500 receives the message, it may confirm the transmission characteristic of the receivers 610 and 620 from the difference between the received energy amount and the required energy amount. The transmitter 500 generates the impedance control signals to be transmitted to the receivers 610 and 620, respectively, in consideration of the transmission characteristic of each of the receivers 610 and 620. In this case, when the transmitter 500 needs to transmit a larger amount of wireless energy to the first receiver 610 than to the second receiver 620, the transmitter 500 may generate the impedance control signals that set the impedance of the first receiver 610 to be increased or set the impedance of the second receiver 620 to be reduced. On the other hand, when the transmitter 500 needs to transmit a larger amount of wireless energy to the second receiver 620 than to the first receiver 610, the transmitter 500 may generate the impedance control signals that set the impedance of the second receiver 620 to be increased or set the impedance of the first receiver 610 to be reduced. The transmitter 500 transmits the generated impedance control signals to the receivers 610 and 620, respectively.

When the receivers 610 and 620 receive the impedance control signals, the operation of controlling the impedance of the receiving resonance body ports 612 and 622 according to the impedance control signals is repeatedly performed until the currently received energy amount coincides with the required energy amount.

As described above, the transmitter 500 may complete the energy' transmission preparation for the receivers 610 and 620 when the received energy amount coincides with the required energy amount based on the impedance control of the receiving resonance body ports 612 and 622 of the receivers 610 and 620.

The transmitter 500 and the plurality of receivers 610 and 620 perform transmitting multiple energy (S930). In this case, the transmitter 500 may simultaneously transmit the wireless energy to the receivers 610 and 620. In this case, the transmitter 500 may transmit the wireless energy signal to the receivers 610 and 620 and the receivers 610 and 620 may transmit the received energy amount and the required energy amount to the transmitter 500 at a predetermined interval of period Therefore, the transmitter 500 may control the transmitted energy amount of the wireless energy signal and the receivers 610 and 620 may control the impedance of the receiving resonance body ports 612 and 622.

Meanwhile, the transmitter 500 may simultaneously transmit the wireless energy to the multiple devices based on the transmitted energy amount and the impedance control of the wireless energy signal as described above, even though other receivers other than the receivers 610 and 620 are added.

The embodiment of the present invention may control the impedance of the receiving resonance body ports based on the operation of the transmitter and the receiver to perform the multiple energy transmission. In particular, the embodiment of the present invention may simultaneously transmit energy to the plurality of receivers by using the transmitter having the single frequency component.

The multiple energy transmission method may resolve the problems in that the transmission time delay occurs due to the existing time division method or the structure of the transmitter is complicated due to the energy transmission in the frequency division method and the problems due to the implementation of the wide bandwidth.

As described above, the embodiment of the present invention transmits the wireless energy to the plurality of receivers using the single transmitter and therefore, needs not to separately provide the transmitters for wireless energy transmission corresponding to each transmitter As a result, the receivers in accordance with the embodiment of the present invention can use the more effective wireless energy transmission method than the receivers that should separately include the transmitters corresponding to each receiver and configure the effective wireless energy transmission network.

In accordance with the embodiment of the present invention, it is possible to simultaneously transmitting the optimal energy to the plurality of receivers by controlling the impedance of the receiver in the energy transmission system.

In particular, in accordance with the embodiment of the present invention, it is possible to transmit the wireless energy without the time delay by simultaneously transmitting the optimal energy to the receivers based on the control of impedance.

Further, in accordance with the embodiment of the present invention, it is possible to transmit the wireless energy without using the complex transmitter structure without the wide frequency band by simultaneously transmitting the wireless energy to the receivers using the single frequency.

Meanwhile, the embodiments is described in detail in the detailed description of the present invention, but may be variously modified without departing from the scope of the present invention. Accordingly, the scope of the present invention is not construed as being limited to the described embodiments but is defined by the appended claims as well as equivalents thereto.

What is claimed is:

1. An apparatus for transmitting wireless energy in an energy transmission system, comprising:
   a transmitting controller configured to generate a wireless energy signal;
   a transmitting resonance body port configured to transmit the wireless energy signal;
   and a transmitting resonance body configured to simultaneously transmit the wireless energy signal transmitted through the transmitting resonance body port to a plurality of receiving apparatuses, wherein the transmitting controller transmits impedance control signals for controlling impedance of each of the receiving resonance body ports of the plurality of receiving apparatuses based on a required energy amount, a received energy amount, and impedance information from each of the plurality of receiving apparatuses.

2. The apparatus of claim 1, wherein the transmitting controller includes: a signal processing unit configured to confirm transmission characteristic based on the reception of the received energy amount and the required energy amount from each of the plurality of receiving apparatuses; and an energy signal generation unit configured to control an energy amount of the generated wireless energy signal according to a control of the signal processing unit.

3. The apparatus of claim 2, wherein the signal processing unit receives the impedance information of the receiving resonance body port from each of the plurality of receiving apparatuses and generates the impedance control signals according to the impedance information of the received receiving resonance body port.

4. The apparatus of claim 3, wherein the signal processing unit transmits the impedance control signals performing a control to increase the impedance of the receiving resonance body port to the receiving apparatus requiring the reduction in energy amount for the wireless energy signal among the plurality of receiving apparatuses.

5. The apparatus of claim 3, wherein the signal processing unit transmits the impedance control signals performing a control to reduce the impedance of the receiving resonance body port to the receiving apparatus requiring the increase in energy amount for the wireless energy signal among the plurality of receiving apparatuses.

6. The apparatus of claim 2, wherein the transmitting controller further include a transmitted energy measuring unit measuring the energy amount of the wireless energy signal output through the energy signal generation unit.

7. The apparatus of claim 6, wherein the signal processing unit calculates the energy amount to be transmitted based on the transmission characteristic and the energy amount of the measured wireless energy signal and controls the energy amount of the wireless energy signal based on the calculated energy amount.

8. An apparatus for receiving wireless energy in an energy transmission system among a plurality of apparatuses for receiving wireless energy in an energy transmission system, wherein the apparatus for receiving wireless energy comprises:
   a receiving resonance body configured to receive a wireless energy signal;
   a receiving resonance body port configured to receive the wireless energy signal from the receiving resonance body; and
   a receiving controller configured to transmit the wireless energy signal to a load and control impedance of the receiving resonance body port according to impedance control signals generated in consideration of transmission characteristics of each of the plurality of apparatuses for receiving wireless energy,
   wherein the transmission characteristics includes a required, energy amount, a received amount, and impedance information of each of the plurality of apparatuses for receiving wireless energy.

9. The apparatus of claim 8, wherein the receiving controller includes: a receiving energy measuring unit configured to measure a received energy amount of the received wireless energy signal; a signal processing unit configured to transmit the received energy amount and the required energy amount required according to energy consumption of the load to a transmitting apparatus; and an impedance control unit configured to control the impedance of the receiving resonance body port according to the impedance control signals.

10. The apparatus of claim 9, wherein the signal processing unit transmits impedance information of the receiving resonance body port to the transmitting apparatus.

11. The apparatus of claim 9, wherein the signal processing unit performs a control to increase the impedance of the receiving resonance body port so as to reduce the energy amount of the wireless energy signal.

12. The apparatus of claim 9, wherein the signal processing unit receives impedance control signals performing a control to reduce the impedance of the receiving resonance body port so as to increase the energy amount of the wireless energy signal.

13. A method for transmitting/receiving wireless energy in an energy transmission system, comprising:
   simultaneously transmitting, by each of the plurality of receivers, transmission state information for receiving wireless energy to a transmitter;
   simultaneously controlling, by the transmitter, impedance of each of the plurality of receivers based on the transmission state information until the energy amount required in the plurality of receivers is transmitted, wherein the impedance of each of the plurality of receivers is controlled based on the transmission state information of each of the receivers;
   and simultaneously setting impedance of the receiving resonance body port according to the impedance control and simultaneously receiving a wireless energy signal according to the set impedance, by each of the plurality of receivers, wherein the transmission state information includes a received energy amount a required energy amount and impedance information of each of the plurality of receivers.

14. The method of claim 13, further comprising: controlling, by the transmitter, a transmitted energy amount of the wireless energy signal based on the transmitted transmission state information.

15. The method of claim 14, wherein in the transmitting of the impedance control signals, the impedance control signals performing a control to increase the impedance of the receiving resonance body port to the receiver requiring the reduction in energy amount for the wireless energy signal among the plurality of receiving apparatuses are transmitted.

16. The method of claim 14, wherein in the transmitting of the impedance control signals, the impedance control signals performing a control to reduce the impedance of the receiving resonance body port to the receiver requiring the increase in energy amount for the wireless energy signal among the plurality of receiving apparatuses are transmitted.

17. The method of claim 13, wherein the transmission state information includes at least one of identifier information of each of the plurality of receivers and the impedance information of the receiving resonance body port.

18. The apparatus of claim 1, wherein the impedance control signals for controlling the impedance of each of the plurality of receiving resonance body ports is controlled based on the transmission state information of each of the receivers.

19. The apparatus of claim 2, wherein the signal processing unit receives the transmission characteristic from each of the plurality of receiving apparatuses at a predetermined interval to generate the impedance control signals until a required energy amount of each of the plurality of receiving apparatuses is received.

20. The method of claim 13, wherein the transmission state information is received from each of the plurality of receivers at a predetermined interval to generate impedance control signals until a required energy amount of each of the plurality of receivers is received.

* * * * *